Sept. 2, 1947.  S. D. POLSEN ET AL  2,426,707
DISPENSING APPARATUS
Filed May 27, 1944   7 Sheets—Sheet 1

INVENTORS
Samuel D. Polsen
And Sven H. Nelson
BY
ATTORNEY

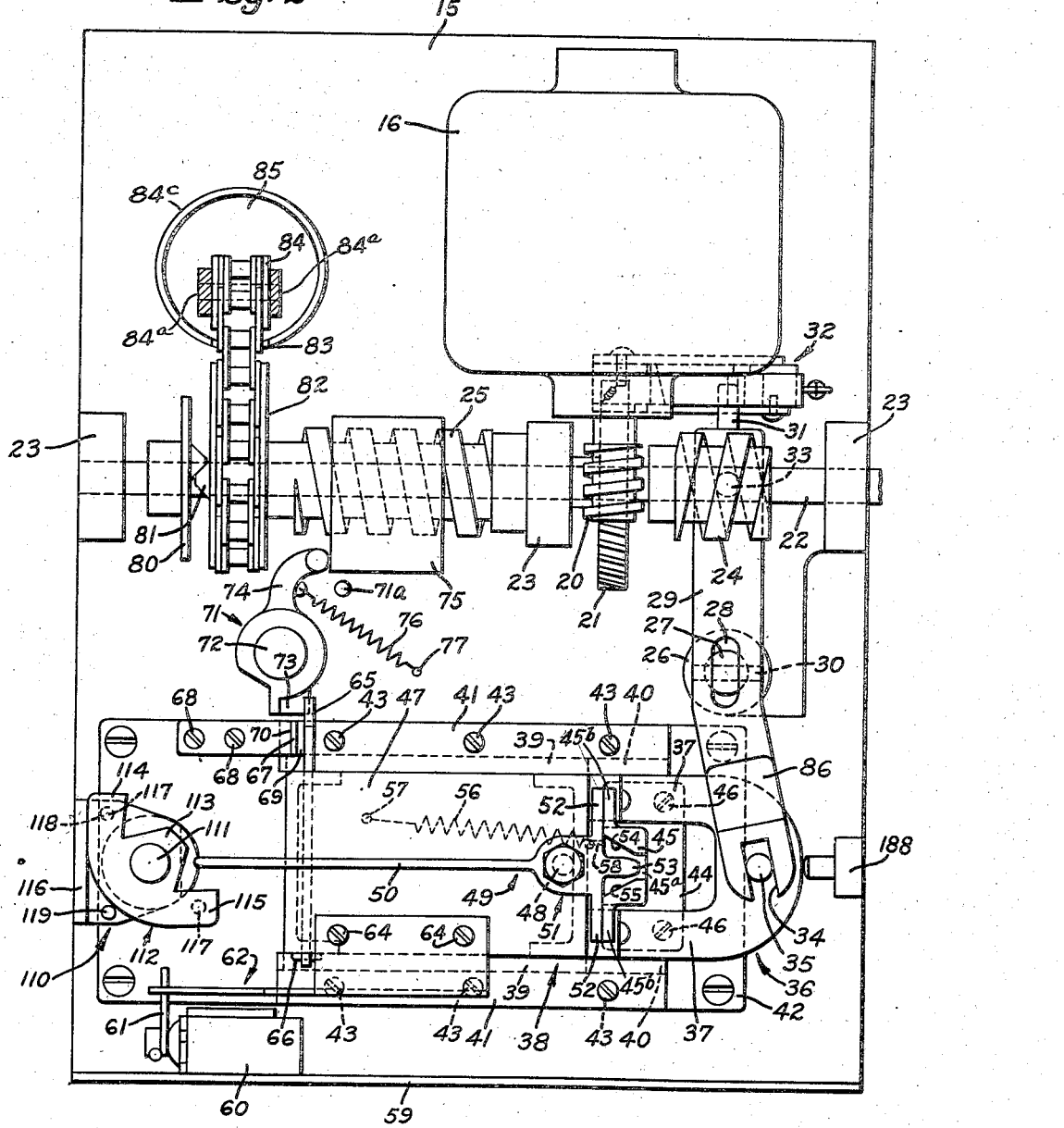

Sept. 2, 1947.                S. D. POLSEN ET AL                 2,426,707
                              DISPENSING APPARATUS
                         Filed May 27, 1944            7 Sheets-Sheet 4

INVENTORS
Samuel D. Polsen
And Sven H. Nelson
BY
John F. Hanrahan
ATTORNEY

INVENTORS
Samuel D. Polsen
And Sven H. Nelson
BY
John F. Hanrahan
ATTORNEY

Sept. 2, 1947.　　　　S. D. POLSEN ET AL　　　　2,426,707
DISPENSING APPARATUS
Filed May 27, 1944　　　　7 Sheets-Sheet 6
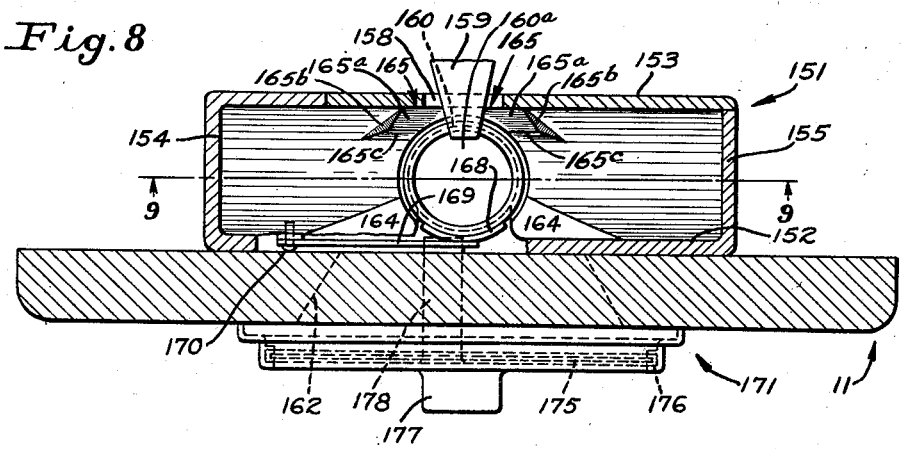
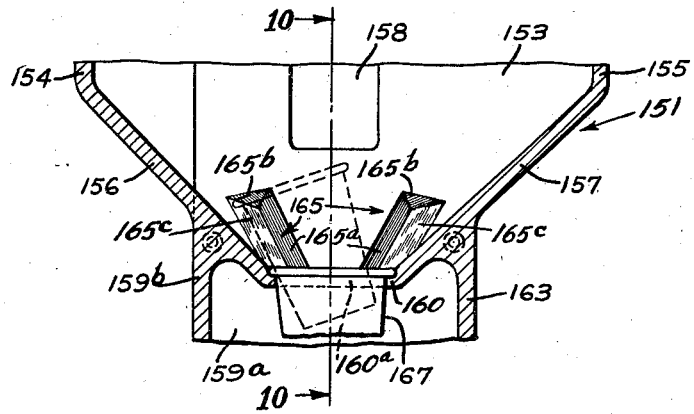
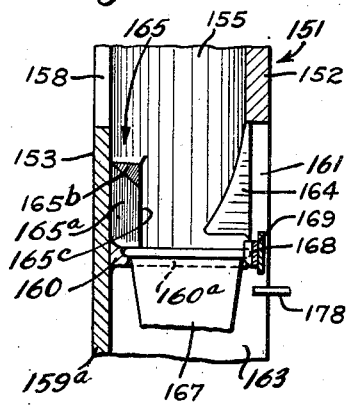
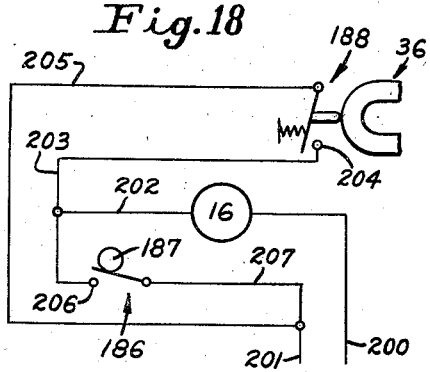
INVENTORS
Samuel D. Polsen
And Sven H. Nelson
BY
ATTORNEY

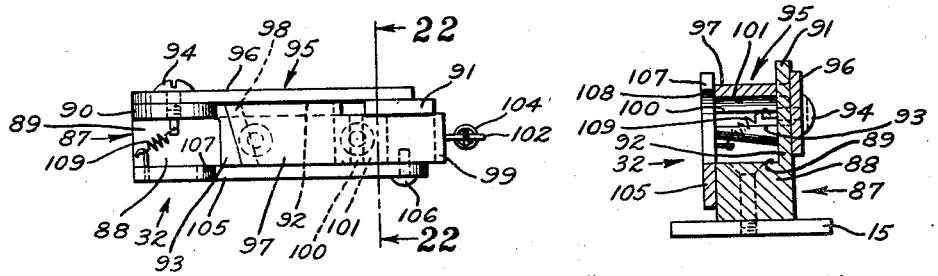
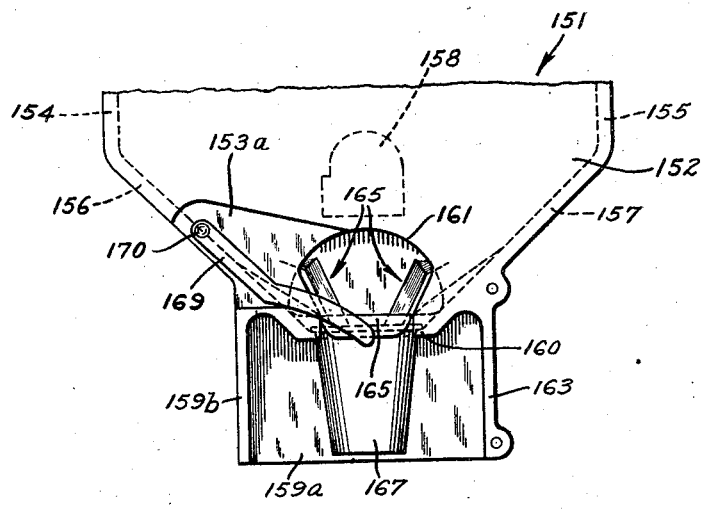
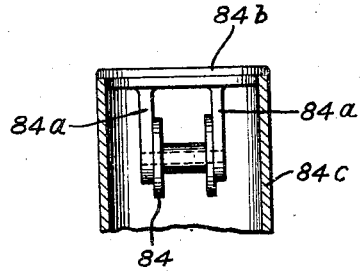
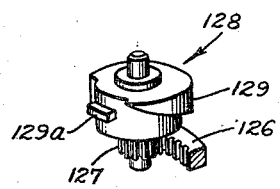

Patented Sept. 2, 1947

2,426,707

UNITED STATES PATENT OFFICE 2,426,707

DISPENSING APPARATUS

Samuel D. Polsen and Sven Herbert Nelson, Bridgeport, Conn., assignors of one-fourth to Blanche H. Polsen and one-fourth to Mildred P. Nelson, both of Bridgeport, Conn.

Application May 27, 1944, Serial No. 537,658

8 Claims. (Cl. 312—44)

This invention relates to new and useful improvements in dispensing apparatus and has particular relation to a means for dispensing articles, especially paper or other inexpensive and disposable containers, as paper cups.

The invention comprehends a mechanism to be used with or as an auxiliary part of a liquid dispensing apparatus and may be mounted in or on the cabinet of a liquid dispensing apparatus or independently of any such cabinet as may be desired or found expedient in any particular instance.

The objects and advantages of the invention will become apparent from a consideration of the following detailed description taken in connection with the accompanying drawings wherein a satisfactory embodiment of the invention is shown. However, it is to be understood that the invention is not limited to the details disclosed but includes all such variations and modifications as fall within the spirit of the invention and the scope of the appended claims.

In the drawings:

Fig. 2 is a top plan view on a larger scale of certain control and operating means of the invention;

Fig. 8 is a horizontal sectional view taken as along the line 8—8 of Fig. 5;

Fig. 9 is a vertical sectional view taken as along the line 9—9 of Fig. 8;

Fig. 10 is a vertical sectional view taken as along the plane of the line 10—10 of Fig. 9;

Fig. 18 shows the wiring diagram;

Fig. 21 is a top plan view of the device shown in Fig. 12;

Fig. 22 is a sectional view taken along the line 22—22 of Fig. 21;

Fig. 23 is a front elevational view of the main housing or casting shown in section in Fig. 9;

Fig. 24 is a sectional view showing the pulley mounting; and

Fig. 25 is a perspective view of one of the elements of a cup feeding mechanism, with some associated parts.

Figure 1:
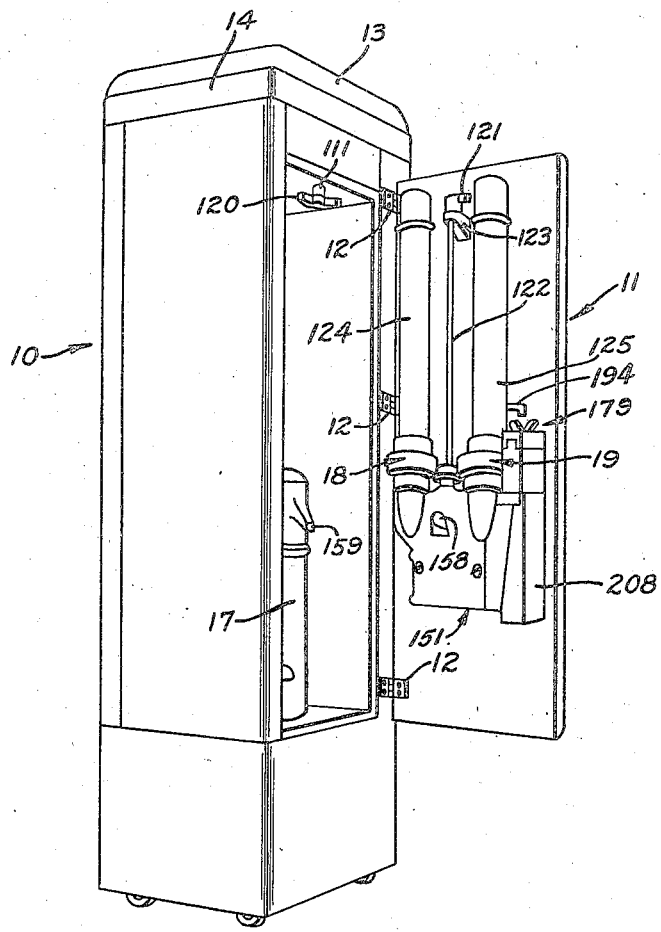
Fig. 1 is a perspective view of a dispensing machine made in accordance with the invention, the main door of the cabinet thereof being partly open to show mechanism mounted thereon.

Referring in detail to the drawings at 10 is generally indicated a refrigerating cabinet including a door 11 hinged as at 12. Cabinet 10 is designated a refrigerating cabinet because in the present instance our invention is disclosed in association with parts of a liquid dispensing apparatus and refrigerating means may be necessary for maintaining the liquid to be dispensed in a cold and palatable condition and to prevent its deterioration. However, it is to be understood that the present invention is not limited to an article or cup dispensing means when mounted on a refrigerating cabinet.

Cabinet 10 is shown as including a readily removable top 13, adapted simply to be lifted off, and a removable band-like upper portion 14 which may also be removed by being lifted. Within the upper portion of the cabinet 10 and mounted on a support or plate 15 is a power operated means including an electric motor 16 and other parts as will be described. The power operated means is coin controlled and while parts of such means have functions in connection with the dispensing of liquid from a container 17 (shown in the cabinet 10) the present description of such parts will be limited to their functions in connection with the operation of present commercial cup dispensing mechanisms generally designated 18 and 19, respectively.

On the shaft of motor 16 is a worm 20 through which the motor, when energized, serves to drive a worm wheel 21 fixed on a shaft 22 extending at right angles to the motor shaft and supported at the upper side of the plate 15 as in suitably spaced bearings 23. A worm 24 is fixed to shaft 22 at one side of the wheel 21 while a somewhat longer worm 25 is mounted to turn on said shaft 22 at the opposite side of said wheel.

Mounted for turning movement in a spud or projection 26 is a vertical post 27 having its upper portion flattened at opposite sides and received in a slot or elongated opening 28 intermediate the ends of an arm 29. A horizontal pin 30 passes through such intermediate portion of the arm and through the flattened upper end portion of the post and serves to secure the arm to the post for rocking or pivotal movement relative thereto. From the forward or inner end of the arm 29 a pin 31 projects into a guide or transfer device generally designated 32 while from the upper side of the forward or inner end portion of the arm a stud 33 projects vertically to enter into the thread of the worm 24.

At its outer end the arm 29 is bifurcated as at 34 and straddles a vertically disposed pin 35 mounted by a horse-shoe shaped piece 36 having the inner or free ends of its arms 37 riveted, bolted or otherwise secured to the rear end portion of a horizontally slidable carriage generally designated 38. Carriage 38 includes laterally extending lower side portions 39 received in ways 40 partly defined by the inner edge portions of strips 41 secured to a base casting 42 as at 43. An L-shaped member including a foot portion 44 and a vertical portion 45 is mounted on the mentioned casting as by screws 46 passing through its said foot portion. It is noted that the L-shaped member is at one end of the carriage or slide 38 and is straddled by the arms 37 of piece 36. Wings 45b extend laterally to each side of the vertical portion 45.

Carriage 38 includes an upper or top plate 47 to which a bolt 48 pivotally secures a device generally designated 49 including a finger-like portion 50 and a head portion 51 the latter including lateral portions 52 and a projecting tongue-like portion 53. Device 49 is shown with its portions 52 against the vertical portion 45 of the above mentioned L-shaped member and with its tongue-like portion 53 disposed in an opening 45a in portion 45 and which opening is provided with a pair of inclined faces 54 and 55. A coil spring 56 anchored to the carriage at 57 and to the member 45 at 58 tends to retain the carriage in position supporting the device 49 as shown in Fig. 2 and to return such parts to such positions when moved therefrom and then released.

Fixed to a front vertical flange 59 of the plate 15 is a counter 60 having an actuating arm 61. This counter is a commercial product of well known construction now on the market. As the arm 61 is depressed and released the counter registers. On the carriage 38 is a member 62 including an inclined lower edge 63 riding on the counter arm 61. The arrangement is such that each time the carriage 38 is advanced and retracted the lower edge 63 of the member 62 riding on the arm 61 serves to depress the latter and cause the counter to register one additional digit. As shown the member 62 is formed from a piece of sheet metal and is secured to the carriage by screws or the like 64.

A latch bar 65 is carried by and extends across the forward end portion of the carriage 38 and is adapted for vertical pivotal movement about a pivot 66 rigid with the carriage 38. This latch plate passes through a slot 65a in a wall of the carriage 38 and the pivot 66 permits of tilting movement of the latch plate in the slot but prevents the latter passing entirely through the slot. A keeper plate 67 is fastened to the casting or base 42 as by screws 68 and includes a portion having an inclined surface 69 and a straight or vertical surface 70. The keeper is positioned in the path of movement of the free end portion of the latch 65 and as the carriage 38 moves toward the left in Fig. 2 (as will be set forth) the free end of the latch bar moves up surface 69 and then as movement of the carriage continues the latch bar is shifted to a point where its free end portion drops back of the surface 70 so that return movement of the carriage under the influence of spring 56 is prevented until the latch bar is raised and freed of the surface 70.

Figure 3:
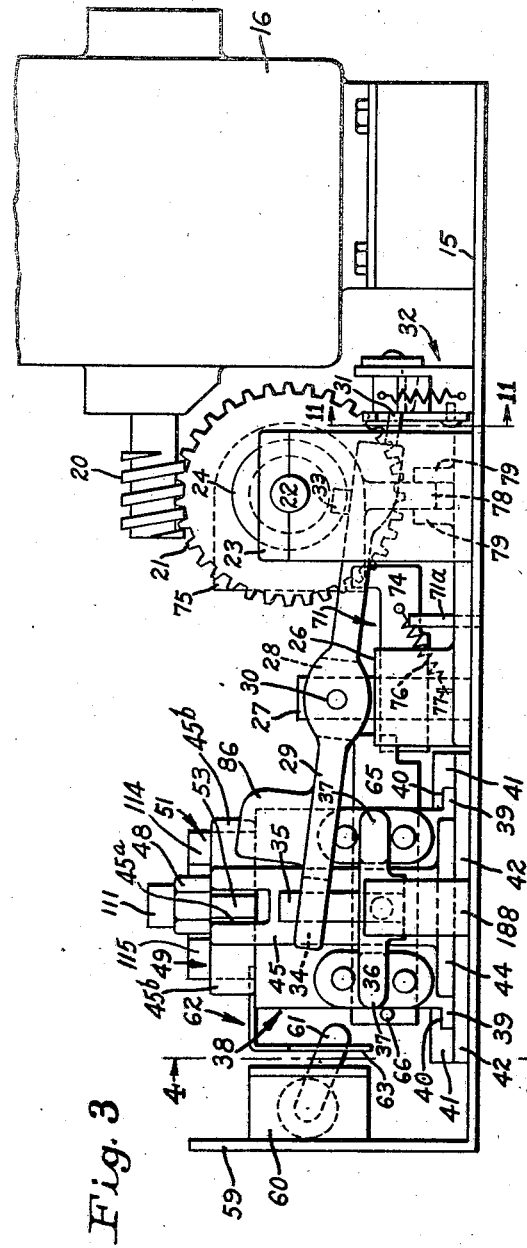
Fig. 3 is a side elevational view of the mechanism of Fig. 2 the view being taken as looking toward the right side of said Fig. 2.
Figure 4:
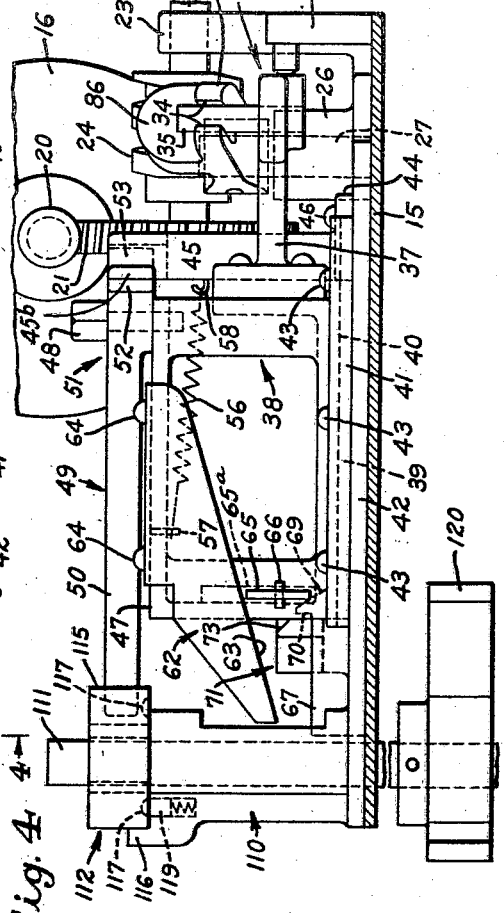
Fig. 4 is a sectional view taken as along the line 4—4 of Fig. 3.

A lifter or releasing device 71 is located on the upper side of plate 15 to one side of the path of movement of the carriage and is turnable about a pivot 72. Such device includes an inclined or bevelled portion 73 and an arm-like portion 74 located in the path of movement of a nut 75 on the worm or feed screw 25. Device 71 is biased about the pivot 72 in a direction to bring its arm-like portion 74 against a stop pin 71a and to take its bevelled portion 73 away from the free end portion of the latch 65, as by a coil spring 76 secured to portion 74 and anchored to the plate 15 as at 77. Nut 75 is adapted to be fed back and forth by the worm 25 as the latter is turned first in one direction and then in the opposite direction and the nut is held against turning movement with the worm since the nut is provided on its underside (Fig. 3) with a projection 78 slidable along between a pair of members 79 carried by the casting 42.

While the screw 25 is feeding the nut 75 toward the arm 74 motor 16 is operating and is rotating the shaft 22 and a shiftable clutch element 80 driven by the shaft is engaged with the teeth 81 of a combined clutch and reel 82 whereby the latter is being rotated by the motor to wind up a chain 83 and raise a weight which may be and preferably is in the form of a dipper pivoted on the lower end of a rod as disclosed in our copending application Serial Number 438,232 filed April 9, 1942, now Patent 2,378,430 of June 19, 1945. Shiftable clutch element 80 may be controlled in any suitable manner or by any suitable means, as, for example, the means disclosed in the mentioned patent.

Chain 83 passes over a pulley 84 supported as by brackets 84a and through an opening 85 in plate 15 and at its lower end supports the mentioned weight (the dipper) not shown. The brackets 84a are in the nature of fingers or lugs depending from the under side of a cap 84b normally disposed on the upper side of a tube 84c passing through the opening 85 in the plate 15. In Fig. 2 the view is taken as though cutting immediately under the cap 84b but such cap and the lugs and pulley are shown assembled in Fig. 24. At the proper time any suitable means, as the means disclosed in said patent, shifts clutch element 80 thereby releasing the reel 82 from the shaft 22 and the weight on the chain 83 draws the latter downwardly reversing the direction of movement of the reel and the latter being fast to the worm or screw 25 rotates the latter on shaft 22 but in a direction reverse to that in which it is driven by the motor so that the nut 75 is fed back toward the worm wheel 21.

However, the relation of the parts with which we are immediately concerned is such that prior to the limit of its feed by the screw 25 the nut 75 engages the arm 74 of means 71 and rocks such means in opposition to the spring 76 whereby the cam-like portion of the means enters under and raises the free end portion of the latch 65 freeing the said latch from the shoulder 70 of the keeper whereupon the spring 56 may act to impart return movement to the slide 38 which slide has previously been moved by the motor 16 as will now be described.

When the motor is operating it is rotating the worm 24 in a direction to feed the pin 33 and thus the inner portion of arm 29 toward the right as seen in Fig. 2. Thus the arm pivots with the post 27 and receiving the pin 35 in its bifurcation 34 moves the pin and the piece 36 toward the left as viewed in Fig. 2 shifting the slide 38 in such direction and tensioning the coil spring 56.

In addition to the described pivotal movement with the post 27 the arm 29 is mounted for rocking movement with the pin 30 as an axis. A weight 86 on the outer end portion of the arm 29 tends to maintain the same in position with its pin 33 either in the thread of the worm 24 or in a position tending to enter such thread. The position of pin 31 in the transfer device 32 determines whether the pin 33 is permitted to enter the thread of worm 24 or is held spaced from such entry for a return movement of the arm 29 with post 27 as an axis.

Transfer device 32 (see Figs. 11, 12, 21 and 22) includes a body 87 comprising a mounting portion 88 and a horizontal surface portion 89 above which projects spaced ears 90 and 91. A rear wall 92 of the body carries a forwardly extending ledge 93 disposed above and in substantially parallel relation with the surface 89. A pivot 94 mounts a movable transfer element 95, including a plate-like portion 96, at the rear of the ears 90 and 91 and pivoted to the ear 90.

Carried by portion 96 is a top portion 97 connected with the plate at a point between the ears 90 and 91 and then extending toward an end of the body 87 in such position that the ear 91 is received between such top portion 97 and the rear plate-like portion 96. Portion 97 is bevelled at its inner end as at 98 and at its outer end is thickened as at 99 and provided with a slight nib 100 and beyond such nib with an inner end wall 101. A pair of pins 102 and 103 projecting from the ends of the body 87 and the thickened end portion 99 have a coil spring 104 anchored to them at its respective ends and this spring constantly tends to keep the element 95 in the position shown in Fig. 11.

It will be understood that the top portion 97 of element 95 is located over or vertically above the ledge 93 and that movement of the element 95 on its pivot 94 is guided by the ear 91 of the body and which ear is located between portions 96 and 97. A transfer member 105 is pivoted to the body 87 at 106 and at its free end includes a projecting portion 107 curved in its inner side to provide a socket or recess 108. A coil spring 109 is anchored at its respective ends to the pivot 94 and the member 105 and constantly tends to maintain said member in the position of Fig. 12.

Figures 11, 12:
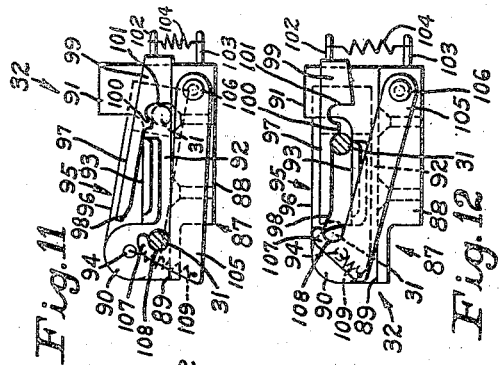
Fig. 11 is a vertical sectional view taken as along the line 11—11 of Fig. 3.
Fig. 12 is a view similar to Fig. 11 but showing the parts in another position.

Fig. 12 shows the pin 31 on the upper side of the ledge 93 and closely adjacent the end of such ledge. When pin 31 is in this position pin 33 is in the thread or groove of the nut 24 and is being fed therealong and the arm 29 is being rocked with the post 27 as a pivot and in a direction to force the piece 36 and thereby the slide 38 toward the left as viewed in Fig. 2. Now approximately as the pin 33 reaches the end of the groove of worm 24 the pin 31 acting against the side of the nib 100 forces the outer end portion of the element 95 upwardly further stretching the coil spring 104 beyond the position of Fig. 12.

Pin 31 then passes off the ledge 93 and being no longer supported by the ledge is only urged upwardly by the weight 80. Spring 104 then acts to move the element 95 about the pivot 94 and thus such element is shifted from the position of Fig. 12 to that of Fig. 11 and the pin 31 moved down to the dotted line position of Fig. 11 and the pin 33 disengaged from worm 24. Arm 29 remains in a position corresponding with the mentioned dotted line position of pin 31 until the latch 65 is released and then as the slide 38 returns to normal position because of the tendency of spring 56 it returns the piece 36 and the arm 29 to their normal positions. During this return movement of the arm its pin 31 is below the ledge 93 and on the surface 89 and the arm carried pin 33 is maintained below the worm 24.

As the arm 29 is returned to the mentioned position the pin 31 riding under the ledge 93 forces the member 105 to rock about its pivot 106 against the action of the spring 109 and when the pin 31 comes to the end of the ledge and is freed of the latter spring 109 rocks member 105 on its pivot, carrying the pin 31 from the full line position of Fig. 11 to the dotted line position of Fig. 12. This involves an upward movement of the pin 31 and of the end of arm 29 and carries the pin 33 into the thread or groove of worm 24 ready to be again fed across the transfer means to repeat the cycle of operation described.

A collar or bearing means 110 on the upper side of the base 42 receives a portion of a vertical shaft 111 to the upper end portion of which is fixed a head 112 comprising a body 113 fixed to the shaft and a pair of wing-like portions 114 and 115. An extension or flange 116 on the bearing means 110 forms a stop for the member 112 limiting its turning movement relative to the said bearing means. Each wing 114 and 115 has a socket 117 in its underside and a pair of spring pressed plungers 118 and 119 are adapted to enter the sockets of the respective wings when the latter are moved into alignment with the plungers.

Head 112 is rocked in alternate directions on successive movements of the slide 38 toward the head. Thus as the worm 24 rocks arm 29, with the post 27 as the axis, the slide 38 is moved toward head 112 owing to the connection of the arm with the piece 36, which connection is through the bifurcated end portion 34 of the arm and the pin 35. As the slide moves (assuming the parts to be positioned as in Fig. 2) the free end of the part 50 of member 49 engages the body portion 113 of the head at the side of said body toward the wing 115 and will slide on the inclined wall of the body into the notch between the body and wing and will rock the head in a clockwise direction as viewed in Fig. 2. Since the head is fast to the shaft 111 a similar movement is imparted to the shaft. The flat outer side of said wing will engage flange 116 fixing the limit of movement of the parts.

Later the slide 38 moves back as has been described and the position of the head has been reversed from that shown in Fig. 2. Now when the slide or carriage is again advanced the free end of part 50 engaging the inclined side of body 113 toward the wing 114 slides into the notch between said wing and the body and rocks the head 112 and the shaft 111 back to the position of Fig. 2, the movement being in a counterclockwise direction. Thus the head or member 112 and the shaft 111 are rocked back and forth on alternate movements of the slide 38. On each return movement of the slide the tongue-like extension 53 of the head 51 of member 49 engaging one of the inclined surfaces 54 and 55 is shifted to bring the entire member 49 back to the normal straight position of Fig. 2 so as to have its free end disposed adjacent one side of the body 113 of head 112.

Figure 16:
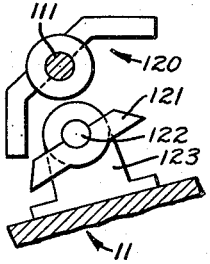
Fig. 16 is a detached view in top plan of a pair of clutch or coupling elements in one position.
Figure 17:
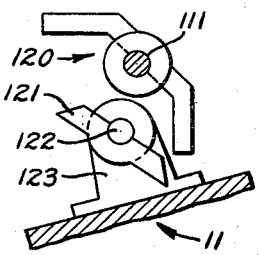
Fig. 17 is a similar view of such elements but in another position.

The shaft 111 passes downwardly through the plate 15 and the inner top wall of cabinet 10 being exposed within the cabinet as shown in Fig. 1. Within the cabinet a coupling element 120 (see Figs. 16 and 17) is fixed to the shaft and when the door 11 is closed such element is coupled with a complemental element 121 fixed on the upper end of a shaft 122 mounted on the inner side of the cabinet door. Element 121 enters the open side of the element 120 when the door 11 is closed so that any turning movement imparted to the head 112 and thus to the shaft 111 is transmitted through the coupling elements to the shaft 122.

Shaft 122 is mounted for turning movement in a bearing 123 on the inner side of door 11 and is located between a pair of tubular cup holders 124 and 125 which at their lower ends enter or communicate with the entrances of the cup dispensing mechanisms 18 and 19, respectively. The mechanisms 18 and 19 are well known commercial structures and therefore will be but briefly described herein. It is here noted that the mechanisms used need not be those herein disclosed as the invention is not limited to such or to any special construction of cup dispensing mechanism.

Devices 18 and 19 are alike and are shown in detail in Patent 2,268,421 of December 30, 1941 to Reifsnyder et al. However, the structures are briefly described here and each includes a ring 126 having rack teeth in its inner peripheral edge and which teeth mesh with those of small gears 127. On the shafts with gears 127 are elements 128 each having a peripheral flange 129 about a portion of its edge. The ring 126 is turnable within the walls 130 of the shells of the respective mechanisms and such wall of each mechanism has an arcuate elongated slot 131 therein and through which passes a pin 132 rigid with the ring 126 of such mechanism. When the elements are positioned with their flanges 129 as in Fig. 6 a cup entering the mechanism will be supported by having its lip or bead rest on surface portions 129a of the elements and which surface portions are located in planes below the planes of the lower surfaces of the leading ends of the flanges 129.

As the pin 132 is moved from one end of its slot 131 to the other end thereof the ring 126 is given a turning movement and the elements 128 are moved with the small gears and the positions of the elements reversed to have surfaces 129a toward the wall 130 of the shell of the mechanism. Now the lowermost cup entering the mechanism is supported by having its bead rest on the top faces of the elements 128 and the cup formerly the lowermost of the stack has been dispensed. On the next movement of pin 132 the stack of cups falls to the surfaces 129a of the mechanism 18 or 19 as the case may be. The next movement is as first described and the lowermost cup is separated from the stack and forced down and out of the mechanism by the flange 129.

Thus the two mechanisms 18 and 19 are of such construction that on movements of their pins 132 first in one direction and then in the opposite direction the entire stack entering the mechanisms is dropped by the first movement and is thereafter supported on the surfaces 129a of the elements 128. On the second motion of the pins the lowermost cup is separated from the stack and while the latter is supported on top faces of elements 128 the lowermost cup is separated from the stack and dropped from the mechanism.

In the present construction we arrange the mechanisms 18 and 19 in opposite relation to one another or in stepped relation in so far as their operation is concerned. Our present operating means moves the pins 132 of the two mechanisms simultaneously and in the same direction. However, the stepped relation of the parts is such that as the pins are moved in one direction the stack entering one mechanism is supported on the surfaces 129a while the stack entering the other mechanism is supported on the top faces of elements 128. Therefore at the time that the lowermost cup is dropped from the first mechanism the stack entering the second mechanism is dropped onto the surfaces 129a of the elements of such mechanism.

Now on reverse movements of the pins the lowermost cup is dropped from the second mechanism and the stack of the first mechanism is again dropped onto the surfaces 129a of such mechanism. Thus each time the pins 132 of the mechanisms are operated they are operated simultaneously (by means to be described) and cups are fed from one mechanism, as mechanism 18, on the first movement of the pins 132 and from the other mechanism, as mechanism 19, on the second or reverse movements of the pins.

Figure 13:
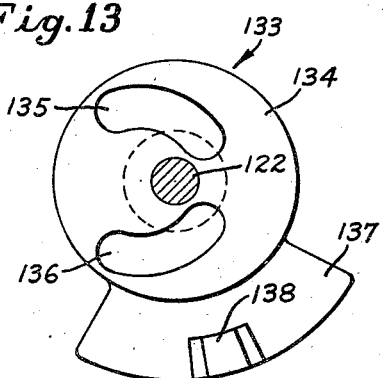
Fig. 13 is a plan view of a part of the means for operating the commercial cup dispensers employed and shown in Figs. 1, 5 and 6.
Figure 14:
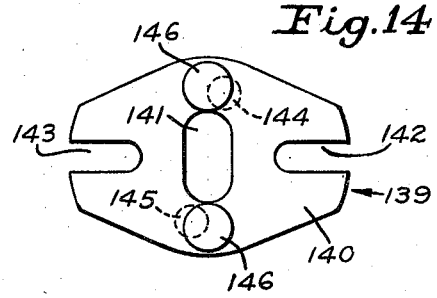
Fig. 14 is a similar view of another part of such means.
Figure 15:
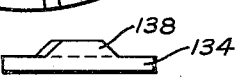
Fig. 15 is a detail elevational view of a portion of the edge of the part of Fig. 13.

Means are provided whereby movement of shaft 122 is translated into movement of the pins 132. To this end the lower end of the shaft is rigid with an element 133 (see Fig. 13) comprising a body 134 having a pair of arcuate depressions or cam recesses 135 and 136 located in one side thereof and at opposite sides of the axis or center of movement of the body as represented by the shaft 122. An extension 137 of the body carries a cam 138 on its upper side the purpose of which will be set forth. Disposed on the upper side of the body 134 is a member 139 (see Fig. 14) comprising a body 140 having a slot 141 therethrough and having slots 142 and 143 entering from its opposite sides or ends. A pair of pins 144 and 145 project from the underside of body 140 and enter the respective depressions 135 and 136.

Figure 5:
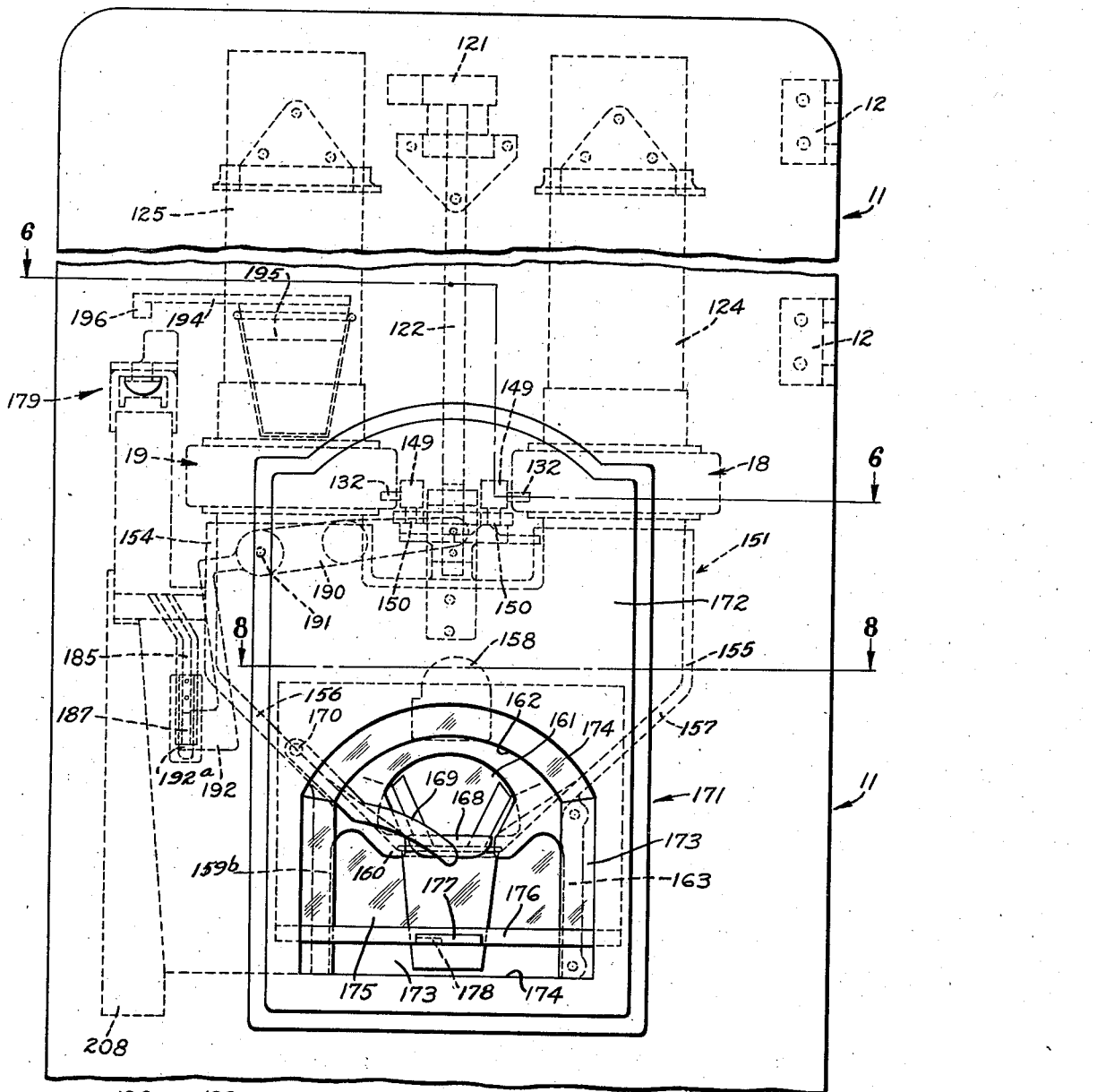
Fig. 5 is a front elevational view of a portion of the main door of Fig. 1 and showing the same on a larger scale and from the front side with the mechanism mounted thereon.
Figure 7:
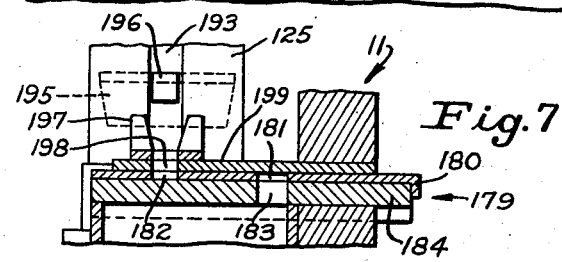
Fig. 7 is a detailed sectional view taken as along the line 7—7 of Fig. 6.
Figure 6:
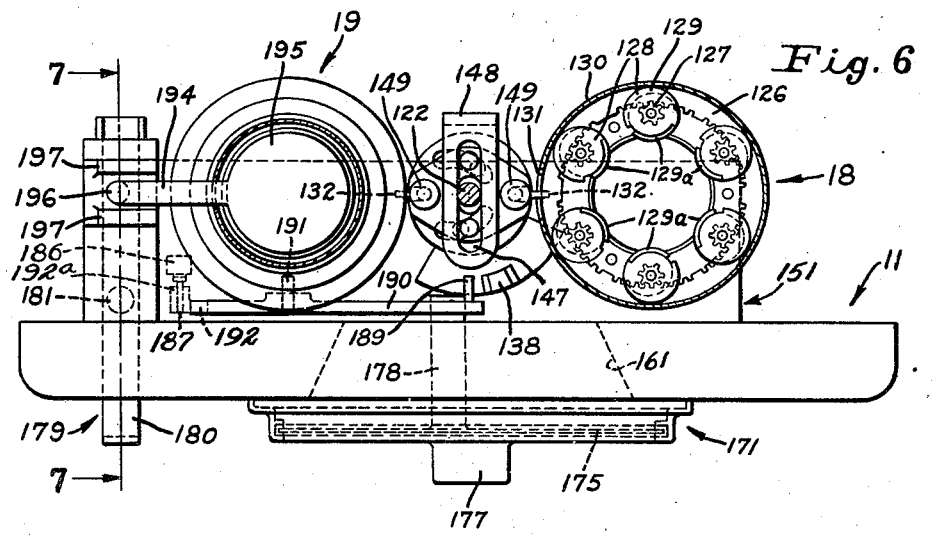
Fig. 6 is a horizontal sectional view taken as along the line 6—6 of Fig. 5.

The slot 141 provides for the passage of the shaft 122. A pair of pins 146 on the upper side of the body 140 and at opposite ends of the slot 141 enter a slot 147 in a fixed bracket or guide member 148 extending over the member 139 and fast to the door 11. As best shown in Figs. 5 and 6 elements 149 are connected with the exposed ends of the pins 132 and each such element includes a pin-like portion 150. Such portions of the elements on the pins of the respective mechanisms 18 and 19 extend into the slots 142 and 143 in the body of element 139.

Our construction is such that when shaft 122 is turned through approximately 90 degrees the same movement is imparted to the element 133. The pins 144 and 145 on the underside of the element 139 are in the recesses 135 and 136 of the member 133 but the member 139 cannot turn with the element 133. The center of element 133 remains the same. Therefore as 133 is turned the element 139 is given a movement in the direction of the length of the slots 141 and 147 (in element 139 and bracket 148, respectively) and in a direction transverse to the directions of the lengths of the slots 142 and 143. Thus owing to the pins 150 and heads 149 the pins 132 are given movements along the slots 131 in the shells of the mechanisms 18 and 19 as the shaft 122 is turned.

As the shaft is turned in one direction the element 139 is moved in one direction and as the direction of turning of the shaft is reversed the element 139 is moved back to its original position. Therefore on turning of the shaft 122 in one direction a cup is fed from one mechanism (as 18) while the stack of the other mechanism drops onto the surfaces 129a of the elements thereof. Then on reverse movement of the shaft 122 the lowermost cup of the other mechanism (as 19) is fed from the latter and the stack of the other or first mechanism is lowered or drops onto the surfaces 129a of its elements 128.

The cups fed from the mechanisms 18 and 19 enter the upper portion of a casting generally designated 151 (see Figs. 1, 5, 8, 9 and 10) comprising front and back walls 152 and 153 and end walls 154 and 155 the lower portions of the latter being inclined toward one another as at 156 and 157, respectively. Wall 153 has an opening 158 therethrough to receive the discharge spout 159 of a container 17 when the cabinet door 11 is in closed position. A section of wall 153 is made removable to facilitate cleaning of the interior of casting 151.

At their lower ends the wall portions 156 and 157 together with the rear wall 153 form an exit 160a partly surrounded or partly defined by a lip 160 comprising a substantial portion of a circle but open at its forward side, or its side toward the door 11. Inclined wall portions 156 and 157 form the sides of a chute leading from the mechanisms 18 and 19 to the common exit 160a. The forward portion of casting 151 is cut away as along the line 161 (see Figs. 5 and 23) and an opening 162 is provided in the door 11. Openings 161 and 162 are in alignment or register and so a person may, by reaching through such openings, take a cup which is being supported in the compartment by the lip 160. Depending wall portions 159a, 159b and 163, comprising portions of the back wall 153 and the end walls 154 and 155, respectively, of the casting 151 close off the openings 161 and 162 from the inside of the cabinet 10. Thus, when a cup is suspended from the lip 160 such cup is located in a compartment, three sides of which are made up by the wall portions 159a, 159b, and 163. The front side of such compartment is defined by a glass panel 175, the mounting of which will later be described.

The paper cups used have a lip about their upper edges as is usual and when a cup is fed from one of the mechanisms 18 and 19 it drops into the casting 151 and onto either the wall 156 or the wall 157 depending on the mechanism from which the cup has been fed. The front and rear walls of the casting 151 toward the lower ends of the walls 156 and 157 are provided with cam-like or raised portions 164 and 165, respectively. Such portions may be merged into both the respective end walls 156 and 157 and the adjacent portions of the front and rear walls.

The cam-like or raised portions 164 and 165 are somewhat in the nature of raised fillets between the inclined walls 156 and 157 and the front wall 152 and the back wall 153, respectively, of the casting. Referring particularly to Figs. 8, 9, and 10, the portions 165 each include several faces. Thus, each raised portion 165 includes a downwardly and laterally inclined surface 165a, a downwardly and slightly forwardly inclined surface 165b, and a nearly vertical forward surface 165c. No particularly shaped angles are actually required between the surface portions and their points of connection may be in the nature of mergers so that a smooth structure is provided which is easily cast.

As a discharged cup moves down the walls 156 and 157 toward the lip 160 the cup striking the mentioned cam-like portions has its open end thrown upwardly as suggested by the cup 166 shown in dotted lines in Fig. 9 and thus the closed end portion of the cup (which closed end portion is of smaller diameter than the open end portion) is directed through the opening partly defined by the lip 160. The cup finally reaches the position shown by the upper portion of cup 167 of Figs. 9 and 10. When the cup is in the position of cup 167 the spout 159 discharges into the cup but the means for effecting such discharge is not claimed herein and thus will not be further defined.

When the cup is fed as described it is prevented from moving through the open side of the lip 160 and is retained in the exact proper place to receive the discharge from the spout 159 by a small segment 168 which substantially completely closes the open side of the lip. This segment is movable from the position shown and described and is in fact carried on an end of an arm 169 pivotally mounted as at 170 on the front wall 152 of the main casting 151. The arm 169 is located in and is movable in a depressed or recessed portion 153a of the front wall of the casting 151.

On the front side of door 11 and disposed over the above mentioned opening 162 and in fact extending substantially above such opening, is a metal casting 171 the upper portion of which is closed as by a wall 172 which may have a trademark or the like cast therein and the lower portion of which is in the nature of an open frame, the opening 173 therein being defined by the line 174. Casting 171 is somewhat in the nature of a frame and on its opposite inner sides provides vertical grooves or ways in which is vertically slidable a panel 175 of glass or other transparent material. The compartment receiving the cup when the same is suspended from the lip 161 extends through the door 11 and the thickness of the latter provides a portion of the compartment. As the glass panel 175 closes the opening 162 through this door, such panel when in closed position serves to close the compartment and when shifted opens the compartment.

The edge of panel 175 is provided with a metal band or reenforcement 176 having a hand or finger piece 177, in the nature of a lifting device, on its lower portion. Clearly the panel may be raised and lowered in the described vertical ways and may be manipulated by the piece 177. A metal or other rigid finger-like member 178 extends inwardly from the hand piece 177 or the band 176, as may be preferred, and when the panel 175 is closed such finger-like piece is located a considerable distance below the segment 168 but in vertical alignment therewith.

When a cup is to be removed from the lip 160, and it is noted that the lip supports a dispensed cup in suspended relation to the remainder of the structure, the hand piece 177 is used to raise the panel 175 and as the panel is moved upwardly in the casting 171 the finger-like piece 178 engages the under side of the segment 168 or the arm 169 and swings the segment upwardly to an out of the way position, the arm 169 swinging on its pivot 170. Then the operator merely reaches in through the door opening 162 and the opening in the front wall of the box-like casting 151 and removes the cup.

The operation of the present mechanism for the dispensing of a cup, as cup 167, is coin controlled. To this end a coin slot device, generally designated 179, is mounted on the door 11. Such device includes a slide 180 having a pair of openings 181 and 182 therethrough. When the slide is drawn forwardly its opening 181 is exposed at the forward side of the door 11 and then the proper coin is placed in the opening 181 and the slide pushed back through the door. This brings the opening 181 into alignment with an opening 183 through a base member 184 and the coin drops from opening 181 through opening 183 and passes through a channel 185 to close a switch 186 as in the circuit shown in Fig. 18, wherein the coin is numbered 187.

Thus the circuit to motor 16 is closed and the latter operates to rotate the shaft 22 thus rotating the worm 24 and through the clutch element 80 the reel 82 and the worm or feed screw 25. Worm 24 as it rotates rocks the arm 29 with post 27 as an axis thereby forcing the slide or carriage 38 toward the left as viewed in Fig. 2. As the piece 36 is moved by the arm 29 to in turn move the slide 38 a normally closed switch 188 is permitted to close since such switch is held open by piece 36 when the latter is in normal position or the position of rest shown in Fig. 2. Now the motor circuit is closed independent of the switch 186.

As slide 38 moves or is moved the part 50 carried thereby engages the head 112 and imparts a turning movement to the shaft 111 and through the coupling devices 120 and 121 imparts turning movement to the shaft 122. The latter turns the device 133 with the result that the device 139 is fed inwardly or outwardly toward or from the door 11 and operates the pins 132 of the dispenser mechanisms 18 and 19 to dispense a cup from one and condition the other for the dispensing of a cup. As the device 133 is turned its cam 138 rides under and raises a pin 189 on the upper end of a crank arm 190 pivoted at 191 and having its lower end portion 192 provided with a lip-like portion 192a, positioned under the coin while the latter is in switch closing position. As the arm is rocked its portion 192a is moved from under (see Fig. 5) the coin 187 permitting the same to fall from circuit making relation with the switch 186.

When this happens the circuit to the motor is entirely dependent on the switch 188. At this time the slide 38 has been moved completely over and is being held in position since the latch bar 65 is engaged with the stop or shoulder 70 and the slide and in addition thereto, the piece 36 and the arm 29 are held against return movement but with the pin 31 in the dotted line position of Fig. 11 and with pin 33 below the worm 24. Thus the switch 188 remains closed and the motor 16 continues to operate. However, since the shaft 122 has had a turning movement imparted thereto a cup has been released and is on the lip 160.

The motor continues to operate until the nut 75 is fed over sufficiently to operate member 71 lifting the latch bar 65 from the stop 70 so that the spring 56 returns the slide 38, piece 36 and arm 29 to normal positions with pin 31 in the dotted line position of Fig. 12 and pin 33 engaged with worm 24. The return of the piece 36 to its normal position causes it to engage the switch 188 and open the latter bringing the motor 16 to a stop. Now the clutch element 80 has been released from the reel 82 and the weighted chain 83 gravitating downwardly reverses the direction of rotation of the screw 25 thus feeding the nut 75 back to its original or normal position. The operator may now lift the panel 175 and remove the dispensed cup from lip 160.

The tube 125 feeding cups to the mechanism 19 is provided in one side with a vertical slot 193 through which passes an arm 194 of a weight 195. On the outer end of such arm is a plug or projection 196. Weight 195 is a follower and the plug 196 is in vertical alignment with a guide means 197 on the upper side of the coin control means or device 179. As the cups are used from the tube 125 the follower 195 moves downwardly therein and when the last cup is gone the plug 196 passes through an opening 198 in a cover plate 199 of the coin control device and enters the second opening numbered 182 in the slide 180 locking the slide in its innermost position so that it may not be pulled out and a coin placed in its opening 181. Thus when the cups are used up a prospective user may not place his money in the coin control device only to find that he will not be served. When there is no cup available for a user he may not insert his money into the machine.

Referring now to the circuit of Fig. 18 the line wires are numbered 200 and 201. Wire 200 leads to the motor 16 and wire 202 from the motor is connected with a cross wire 203 leading to a contact 204 of the switch 188. When this switch is closed the return circuit is through wire 205 to lead 201. Wire 203 also connects with a contact 206 of the switch 186 and when that switch is closed it serves to connect wire 203 with a wire 207 leading to the line wire 201. With the wiring described and with the switch 188 of the normally closed type but held open by the piece 36 when the latter is in normal position it will be seen that on closing of the switch 186 by the coin 187 a circuit is completed through motor 16 independent of switch 188. Such circuit includes line 200, line 202, and line 203 to contact 206 through switch 186 and wire 207 to line wire 201.

When the piece 36 is moved by the arm 29 the switch 188 is permitted to close and then when the coin is ejected by the kicker device 190 the motor circuit is maintained being then through wire 200, the motor, wire 202, wire 203, contact 204, switch 188, wire 205 and line wire 201. On return of the piece 36 to normal position the switch 188 is opened and the switch 186 at that time being also open the motor is deenergized. When the coin is removed from circuit closing relation with the switch 186 it falls into the lower portion of the casting 151 but at the outer side of the wall 154 thereof and may be removed on opening of a door 208.

Figure 19:
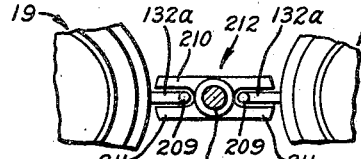
Fig. 19 is a detail plan view on a smaller scale showing a modification for replacing the means of Figs. 13 and 14.
Figure 20:
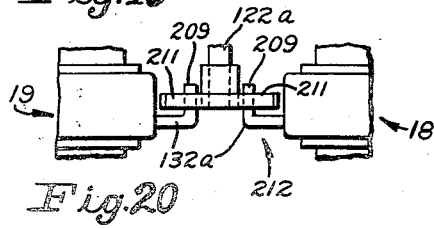
Fig. 20 is a side elevational view of the means of Fig. 19.

Figs. 19 and 20 show a modification of the means for translating turning movement of the shaft 122 about a vertical axis into horizontal movement of the pins 132. Thus in said figures the shaft now designated 122a and the operating pins being designated 132a the said pins are shown as each having attached thereto or integral therewith upright portions 209 received between the arms 210 and 211 of the bifurcated end portion of a lever 212 fixed to the lower end of shaft 122a. Clearly as the shaft 122a is turned first in one direction and then in the opposite direction the pins 132a will be moved back and forth moving the rings 126 of the respective cup dispensing mechanisms 18 and 19 to have them alternately dispense cups as above described.

Having thus set forth the nature of our invention, what we claim is:

1. In a cup dispenser, a cup dispensing mechanism for dropping cups one at a time, means for receiving cups dropped from said mechanism, a horizontal exit at the lower end of said means, said exit including a lip open at one side, movable means closing said side of said lip to prevent casual movement of a cup therefrom, coil controlled power means for operating said mechanism to have it drop a cup, means defining a compartment about said exit, said means including a movable wall for giving access to said exit, and means movable with said wall for moving said movable means to an out of the way position to permit of movement of a cup from said lip through the open side thereof.

2. In a cup dispensing apparatus, a pair of cup feeding mechanisms, a chute for receiving cups from said mechanisms and leading to a common exit, said exit comprising a substantially horizontally disposed opening having thereabout a lip of a diameter to be engaged by the upper portion of a cup and support the latter in a suspended position, the edge of said exit being omitted at one side for lateral removal of a cup from the suspended position, a movable part normally closing the space from which said edge is omitted to prevent tilting of a cup fed to said exit by said chutes, and means manually operable to move said part to an out of the way position to permit of lateral removal of a cup suspended from said lip.

3. In a cup dispensing apparatus, a pair of cup feeding mechanisms, a chute for receiving cups from said mechanisms and leading to a common exit, said exit comprising a substantially horizontally disposed opening having thereabout a lip, said lip of a diameter to be engaged by the upper portion of a cup and support the latter in a suspended position, the edge of said exit being omitted at one side for lateral removal of a cup from suspended position, a movable part normally closing the space from which said edge is omitted to prevent tilting of a cup fed to said exit by said chutes, means defining a closed compartment below said exit, said means including a wall shiftable to give access to said compartment, and means movable with said wall to shift said part to an out of the way position to permit of lateral removal of a cup suspended from said lip.

4. In a dispensing apparatus, a horizontal support, a door below said support, cup dispensing means on the inner side of said door, said door having an opening therein and through which a dispensed cup may be removed, power means on said support, and means for coupling said power means with said cup dispensing means, said coupling means including a part movable with said door and a complemental part below and supported from said horizontal support.

5. In a dispensing apparatus, a horizontal support, a door below said support, a cup dispensing means on the inner side of said door, said door having an opening therethrough and through which a dispensed cup may be removed, a motor on said support, a vertical shaft, means operated by said motor for imparting turning movements to said shaft, first in one direction and then in the opposite direction, a coupling element on the lower end of said shaft inwardly of said door, a shaft on the inner side of said door for operating said dispensing means, a coupling element on said shaft, and said coupling elements comprising complemental parts automatically engageable on closing of said door.

6. In a dispensing apparatus, a horizontal support, a door below said support, a cup dispensing means on the inner side of said door, said door having an opening therethrough and through which a dispensed cup may be removed, a motor on said support, a vertical shaft, means operated by said motor for imparting turning movements to said shaft first in one direction and then in the opposite direction, a coupling element on the lower end of said shaft inwardly of said door, a shaft on the inner side of said door for operating said dispensing means, a coupling element on said shaft, and said coupling elements comprising complemental parts of which one fits into a laterally open side of the other whereby such parts may be separated on opening of the door and automatically engaged on closing of the door regardless of the direction in which the motor last turned the first mentioned shaft.

7. In a dispensing apparatus, means forming a compartment, a chute leading to an upper portion of said compartment, means for releasing paper cups to said chute and thus to said compartment, means to engage the upper portions of a cup moving from said chute and support the cup in suspended position, said last means including a side portion shiftable to permit lateral removal of a cup from said means.

8. In a dispensing apparatus, means forming a compartment, a chute leading to an upper portion of said compartment, means for releasing paper cups to said chute and thus to said compartment, means to engage the upper portions of a cup moving from said chute and support the cup in a suspended position, said last means including a side portion shiftable to permit lateral removal of a cup from said means, a transparent panel closing one side of said compartment, means mounting said panel for movement to give access to said compartment, and means movable with said panel to move said side portion as said panel is moved to permit of removal of a cup from the means to support the cup in a suspended position.

SAMUEL D. POLSEN.
SVEN HERBERT NELSON.

REFERENCES CITED

The following references are of record in the file of this patent:

UNITED STATES PATENTS

| Number | Name | Date |
|---|---|---|
| 1,091,921 | Flatan | Mar. 31, 1914 |
| 2,227,196 | Nicholson | Dec. 31, 1940 |
| 688,874 | McCullough | Dec. 17, 1901 |
| 730,624 | Elliott | June 9, 1903 |
| 1,621,098 | Anderson | Mar. 15, 1927 |
| 2,237,411 | Carlson | Apr. 8, 1941 |